US012603065B2

(12) United States Patent
Fujimori et al.

(10) Patent No.: US 12,603,065 B2
(45) Date of Patent: Apr. 14, 2026

(54) DISPLAY SYSTEM, IMAGE OUTPUT APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventors: Toshiki Fujimori, Chino (JP); Hirohiko Kihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 126 days.

(21) Appl. No.: 18/603,492

(22) Filed: Mar. 13, 2024

(65) Prior Publication Data

US 2024/0312425 A1 Sep. 19, 2024

(30) Foreign Application Priority Data

Mar. 14, 2023 (JP) ................................ 2023-039391

(51) Int. Cl.
*G09G 3/36* (2006.01)

(52) U.S. Cl.
CPC ....... *G09G 3/36* (2013.01); *G09G 2340/0407* (2013.01); *G09G 2340/045* (2013.01)

(58) Field of Classification Search
CPC .......... G09G 3/36; G09G 3/22; G09G 3/3611; G09G 3/3614; G09G 3/3618; G09G 3/3648; G09G 2340/0407; G09G 2340/0421; G09G 2340/04; G09G 2340/045
See application file for complete search history.

(56) References Cited

U.S. PATENT DOCUMENTS

| | | | | |
|---|---|---|---|---|
| 10,242,607 | B2 * | 3/2019 | Kubota | H04N 21/4113 |
| 11,069,325 | B1 * | 7/2021 | Lin | H04N 9/3188 |
| 11,373,625 | B2 * | 6/2022 | Lin | H04N 9/3188 |
| 12,205,557 | B2 * | 1/2025 | Fujimori | G06T 3/4038 |
| 12,334,021 | B2 * | 6/2025 | Yun | G09G 3/3611 |
| 2010/0110294 | A1 | 5/2010 | Oka | |

(Continued)

FOREIGN PATENT DOCUMENTS

| | | |
|---|---|---|
| JP | 2010-108372 A | 5/2010 |
| JP | 2013-122550 A | 6/2013 |
| JP | 2018-036470 A | 3/2018 |

*Primary Examiner* — Vijay Shankar
(74) *Attorney, Agent, or Firm* — Oliff PLC

(57) ABSTRACT

A display system including an image output apparatus that outputs an image having a first aspect ratio, and a display apparatus that displays the image output by the image output apparatus, the display apparatus transmitting resolution information to the image output apparatus, the resolution information containing information indicating a first resolution that is the resolution in a first direction and a second resolution that is the resolution in a second direction perpendicular to the first direction, the image output apparatus performing receiving the resolution information from the display apparatus, and outputting a first image to the display apparatus based on the resolution information, the first image having a third resolution lower than the first resolution, and the second resolution and having an aspect ratio equal to the first aspect ratio, and the display apparatus displaying a second image containing the first image and having the first and second resolutions.

7 Claims, 10 Drawing Sheets

(56) References Cited

U.S. PATENT DOCUMENTS

| | | | | |
|---|---|---|---|---|
| 2018/0061288 | A1 | 3/2018 | Kubota et al. | |
| 2021/0217384 | A1* | 7/2021 | Lin | H04N 9/3188 |
| 2024/0061637 | A1* | 2/2024 | Park | G09G 3/20 |

* cited by examiner

DISPLAY SYSTEM, IMAGE OUTPUT APPARATUS, AND NON-TRANSITORY COMPUTER-READABLE STORAGE MEDIUM STORING PROGRAM

The present application is based on, and claims priority from JP Application Ser. No. 2023-039391, filed Mar. 14, 2023, the disclosure of which is hereby incorporated by reference herein in its entirety.

BACKGROUND

1. Technical Field

The present disclosure relates to a display system, an image output apparatus, and a non-transitory computer-readable storage medium storing a program.

2. Related Art

There is a known technology for causing a display apparatus to display a video output by a video output apparatus. JP-A-2010-108372 discloses a system in which a display apparatus transmits resolution information to a video output apparatus and the video output apparatus outputs a video in accordance with the resolution information.

JP-A-2010-108372 is an example of the related art.

When the aspect ratio of an image displayed by the display apparatus differs from the aspect ratio of an image provided by the video output apparatus, the image displayed by the display apparatus has a margin. The display apparatus therefore performs the display operation in what is called a letterbox, pillar-box, or side-panel format. In this case, since the video output apparatus outputs the margin, unnecessary information is sent to the display apparatus, resulting in a problem of inefficient transmission.

SUMMARY

An aspect of the present disclosure relates to a display apparatus including an image output apparatus that outputs an image having a first aspect ratio, and a display apparatus that displays the image output by the image output apparatus, the display apparatus transmitting resolution information to the image output apparatus, the resolution information containing information indicating a first resolution that is a resolution in a first direction and a second resolution that is a resolution in a second direction perpendicular to the first direction, the image output apparatus performing receiving the resolution information from the display apparatus, and outputting a first image to the display apparatus based on the resolution information, the first image having a third resolution lower than the first resolution, and the second resolution and having an aspect ratio equal to the first aspect ratio, and the display apparatus displaying a second image containing the first image and having the first and second resolutions.

Another aspect of the present disclosure relates to an image output apparatus including a communication apparatus that transmits an image to a display apparatus and at least one processor, the processor performing transmitting an image having a first aspect ratio via the communication apparatus, receiving resolution information from the display apparatus via the communication apparatus, the resolution information containing information indicating a first resolution that is a resolution in a first direction and a second resolution that is a resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio.

Still another aspect of the present disclosure relates to a non-transitory computer-readable storage medium storing a program executed by a computer including a display apparatus and a communication apparatus that transmits an image, the program causing the computer to perform transmitting an image having a first aspect ratio via the communication apparatus, receiving resolution information from the display apparatus via the communication apparatus, the resolution information containing information indicating a first resolution that is a resolution in a first direction and a second resolution that is a resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio.

DESCRIPTION OF EMBODIMENTS

1. Configuration of Display System

Figure 1:
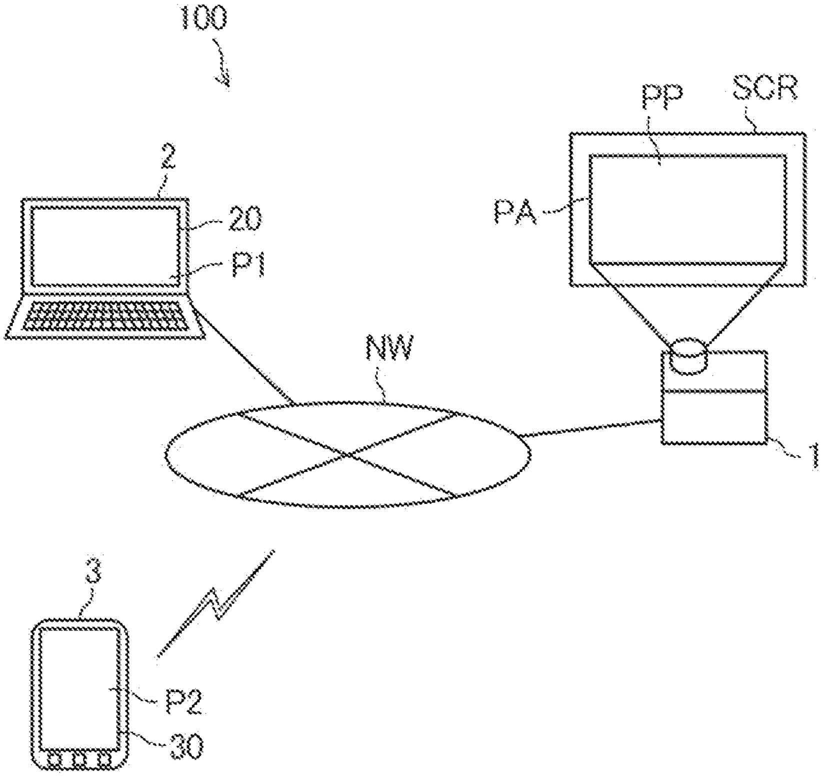
FIG. 1 shows the configuration of a display system.

FIG. 1 shows the configuration of a display system 100.

The display system 100 includes a display apparatus, and an image output apparatus that outputs an image to the display apparatus. There are no restrictions on the type of the image output apparatus connected to the display apparatus, and the number of image output apparatuses. The display system 100 according to the present embodiment includes a projector 1 as an example of the display apparatus, a personal computer (PC) 2 as an example of the image output apparatus, and a terminal apparatus 3. The terminal apparatus 3 is a portable computer, for example, a tablet PC or a smartphone. The image output apparatus can also be called an image source or a video source.

The projector 1 forms an image on a projection surface by projecting image light onto the projection surface. The projection surface is a curtain-shaped screen, a wall of a building, or the surface of any other object. The projection surface is not limited to a planar surface, and may instead be a curved or uneven surface. The projector 1 in the present embodiment uses a screen SCR as the projection surface. In the following description, the formation of an image on the screen SCR performed by the projector 1 is called a display operation, and the image formed by the projector 1 on the screen SCR is called a display image PP. The region of the screen SCR where the projector 1 can form the display image PP is called a display region PA.

The PC 2 and the terminal apparatus 3 are connected to the projector 1. The connection between the projector 1 and the PC 2 and the connection between the projector 1 and the terminal apparatus 3 are not necessarily made in a specific connection method. For example, the projector 1 and the PC 2 may be connected to each other via short-range wireless communication. The short-range wireless communication can be Wi-Fi, Bluetooth, Ultra Wide Band (UWB), or other known wireless communication methods. Wi-Fi is a registered trademark. Bluetooth is a registered trademark. The projector 1 and the PC 2 may instead be connected to each other, for example, via a cable. The cable can be an HDMI (high-definition multimedia interface) cable, a USB (universal serial bus) cable, or a cable compatible with any other known video sending method. HDMI is a registered trademark. The connection configurations described above are equally applicable to the connection between the projector 1 and the terminal apparatus 3.

In the present embodiment, the projector 1, the PC 2, and the terminal apparatus 3 are connected to each other in a data communicable manner via a communication network NW. The communication network NW may be a local network or a global network including a leased line, a public network, and the Internet. The projector 1, the PC 2, and the terminal apparatus 3 may each be connected to the communication network NW via short-range wireless communication or cellular communication, or via a communication cable.

The PC 2 includes a display 20. The display 20 includes a liquid crystal panel or an organic electro-luminescence (EL) panel. The PC 2 displays a PC image P1 on the display 20 with the aid of a function of an application program that will be described later. The PC 2 outputs an image that is the same as the PC image P1 displayed on the display 20 to the projector 1 with the aid of a mirroring function.

The terminal apparatus 3 includes a touch panel 30. The touch panel 30 includes a display panel formed of a liquid crystal display panel or an organic EL panel, and a touch sensor superimposed on the surface of the display panel. The terminal apparatus 3 detects the operation of touching the touch panel 30 via the touch sensor. The terminal apparatus 3 displays a terminal equipment (TE) image P2 on the touch panel 30 with the aid of a function of the application program, which will be described later. The terminal apparatus 3 outputs an image that is the same as the TE image P2 displayed on the touch panel 30 to the projector 1 with the aid of the mirroring function.

The image that the PC 2 outputs to the projector 1 is, for example, digital image data and may be still image data or motion image data. There are no restrictions on the format and other factors of the data that the PC 2 outputs to the projector 1. For example, the PC 2 outputs data compliant with a standard such as MPEG (Motion Picture Expert Group) to the projector 1. The PC 2 may perform streaming transmission of the image data to the projector 1. The image data output by the PC 2 to the projector 1 may be data accompanied by audio data. The same holds true for an image that the terminal apparatus 3 outputs to the projector 1. In the following description, the image that the PC 2 outputs to the projector 1 and the image that the terminal apparatus 3 outputs to the projector 1 are called images irrespective of whether the images are still images or video images.

In the display system 100, when the PC 2 and the terminal apparatus 3 output images to the projector 1, the projector 1 displays the display image PP containing the image output by the PC 2 and the image output by the terminal apparatus 3. When the PC 2 outputs an image to the projector 1, the projector 1 displays the display image PP containing the image output by the PC 2. When the terminal apparatus 3 outputs an image to the projector 1, the projector 1 displays the display image PP containing the image output by the terminal apparatus 3.

2. Configuration of Projector

Figure 2:
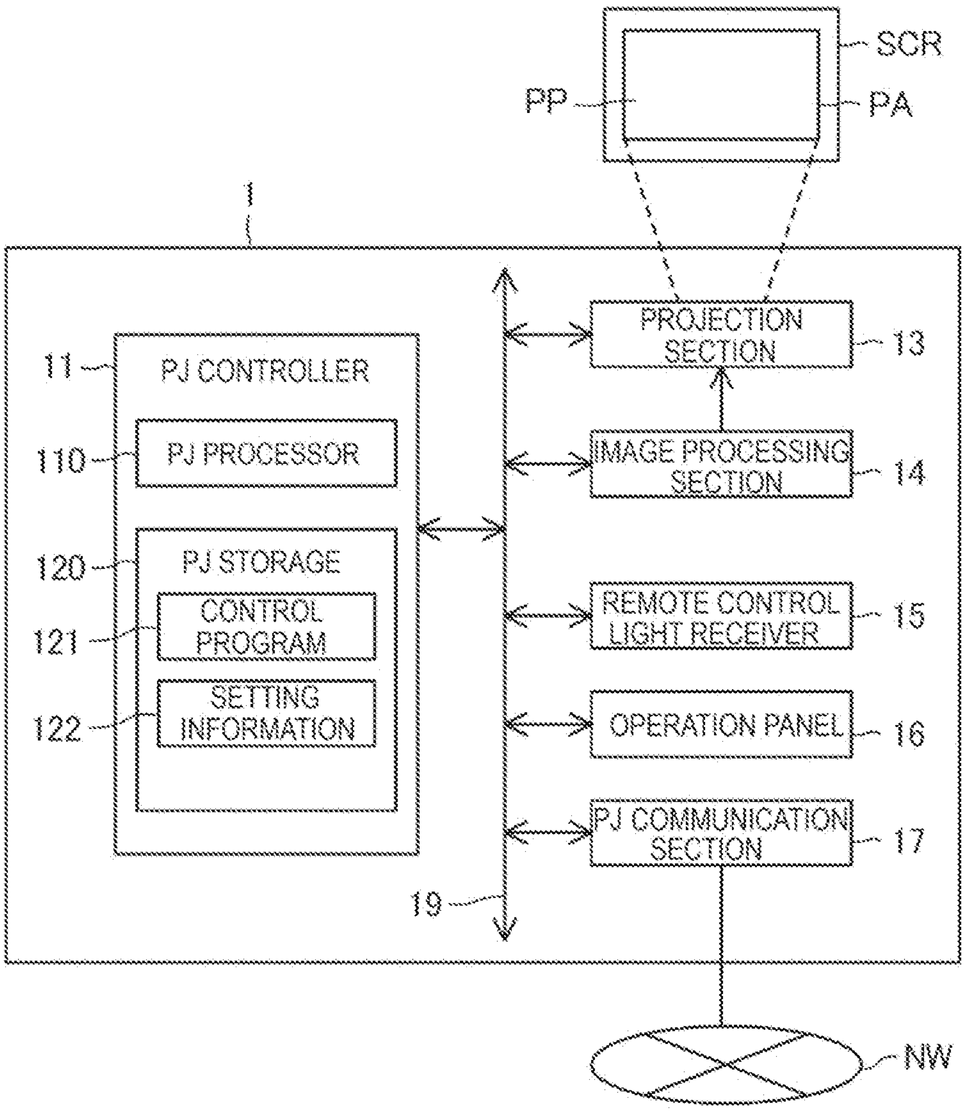
FIG. 2 is a block diagram of a projector.

FIG. 2 is a block diagram of the projector 1.

The projector 1 includes a projector (PJ) controller 11. The PJ controller 11 includes a PJ processor 110 formed, for example, of a CPU (central processing unit) or an MPU (micro-processing unit), and a PJ storage 120. The PJ controller 11 controls each section of the projector 1 by causing the PJ processor 110 to execute a program.

The PJ storage 120 is a nonvolatile storage apparatus formed of a semiconductor memory device such as a flash memory. The PJ storage 120 stores, for example, the program executed by the PJ processor 110 and data processed by the PJ processor 110. The PJ storage 120 stores, for example, a control program 121 and setting information 122. The PJ storage 120 may have a volatile storage region to constitute a work area where the program to be executed by the PJ processor 110 and the data to be processed by the PJ processor 110 are temporarily stored. The PJ processor 110 reads and executes the control program 121 stored in the PJ storage 120 to carry out a variety of processes through the collaboration of hardware and software.

The projector 1 includes a projection section 13, which projects the image light onto a projection surface. The projection section 13 includes, for example, a light source, a light modulator, and a projection system. The light source turns on under the control of the PJ controller 11 and emits light toward the light modulator. There are no restrictions on the configuration of the light source. Examples of the light source may include a lamp, such as a halogen lamp, a xenon lamp, and an ultrahigh-pressure mercury lamp, or a solid-state light source, such as an LED and a laser light source. The light modulator modulates the light emitted by the light source. There are no restrictions on the configuration of the light modulator. The light modulator can be formed, for example, of a reflective liquid crystal panel or a digital micromirror device (DMD). The projection system provided in the projection section 13 includes lenses, mirrors, prisms, and other optical elements that bring the image light modulated by the light modulator into focus at the projection surface. The projection section 13 corresponds to an example of an optical apparatus.

The projection section 13 may include a light source drive circuit that supplies the light source with electric power and a drive circuit that causes the light modulator to draw an image. The projection section 13 may include a zoom mechanism, a focus adjustment mechanism that makes focus adjustment, and other mechanisms. The drive circuits are coupled to the PJ controller 11, for example, via a bus 19 and operate under the control of the PJ controller 11.

The projector 1 includes an image processing section 14, a remote control light receiver 15, an operation panel 16, and a PJ communication section 17. The sections described above are coupled to the PJ controller 11 via the bus 19.

The image processing section 14 performs image processing on the image data input from at least one of the PC 2 and the terminal apparatus 3 under the control of the PJ controller 11. The image processing performed by the image processing section 14 may include, for example, resolution conversion, resizing, geometric correction, digital zooming, luminance adjustment, and projection position correction. The type of the image processing performed by the image processing section 14 is specified by the PJ controller 11. Parameters and data for calculations used by the image processing section 14 to perform the image processing are input to the image processing section 14 from the PJ controller 11. The image processing section 14 generates a display signal used to display a video having undergone the image processing and outputs the generated display signal to the light modulator of the projection section 13. The PJ controller 11 sets based on the setting information 122 the parameters and the data for calculations for the image processing to be performed by image processing section 14.

The image processing section 14 may be formed, for example, of an integrated circuit. The integrated circuit of this type includes an LSI, an ASIC (application specific integrated circuit), a PLD (programmable logic device), an FPGA (field-programmable gate array), an SoC (system-on-a-chip), and other devices. An analog circuit may be provided as part of the configuration of the integrated circuit, or the integrated circuit described above and the PJ controller 11 may be integrated with each other.

The remote control light receiver 15 receives a radio signal transmitted by a remote control apparatus that is not shown. The remote control light receiver 15 generates an operation signal by decoding the received signal and outputs the generated operation signal to the PJ controller 11. The radio signal received by the remote control light receiver 15 is, for example, an infrared signal, and may instead be any other signal.

The operation panel 16 is provided as part of the enclosure of the projector 1 and includes a variety of switches that can be operated by a user. The operation panel 16 outputs an operation signal to the PJ controller 11 when any of the switches is operated.

The PJ communication section 17 is a communication apparatus connected to the communication network NW and including a transmitter that transmits data and a receiver that receives data. The PJ communication section 17 communicates with the PC 2 and the terminal apparatus 3 via the communication network NW. The PJ communication section 17 includes, for example, a connector to which an Ethernet cable is coupled, and a communication circuit that transmits and receives signals. Ethernet is a registered trademark. The PJ communication section 17 may be a wireless communication apparatus that performs the wireless communication described above.

In addition to the PJ communication section 17, the projector 1 may include an interface connected to an instrument as a video source. For example, the projector 1 includes an interface including communication hardware, such as a connector and an interface circuit compliant with a predetermined communication standard. The interface is, for example, a digital interface compliant with HDMI, HDBaseT, USB, or any other standard. HDMI and HDBaseT are registered trademarks. The projector 1 may include an analog video terminal such as an RCA terminal, a VGA terminal, an S terminal, and a D terminal as the interface, and may therefore be configured to be capable of receiving an analog video signal.

The PJ controller 11 accepts the user's input operation via the remote control light receiver 15 or the operation panel 16. The PJ controller 11 causes the projection section 13 to project a video in response to the user's input operation. For example, the PJ controller 11 controls the image processing section 14 to perform image processing on video data, and controls the light source and the light modulator of the projection section 13 to project the video processed by the image processing section 14 onto the projection surface.

3. Configuration of Image Output Apparatus

Figure 3:
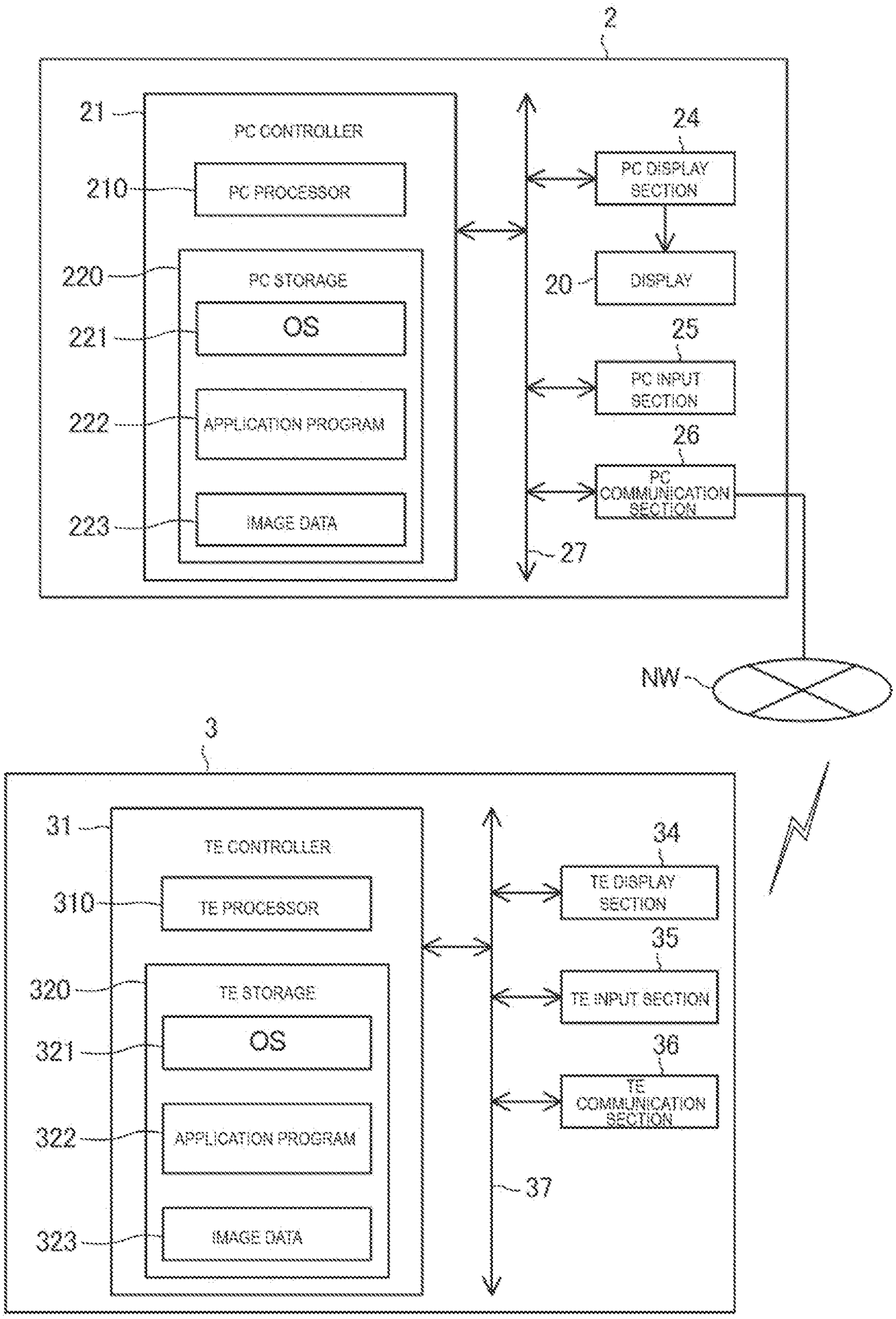
FIG. 3 is a block diagram showing the configuration of an image output apparatus.

FIG. 3 is a block diagram showing the configuration of the image output apparatus, and is also a block diagram of the PC 2 and the terminal apparatus 3.

The PC 2 includes a PC controller 21, a PC display section 24, a PC input section 25, and a PC communication section 26, which are interconnected to each other via a bus 27.

The PC controller 21 includes a PC processor 210 and a PC storage 220. The PC processor 210 is formed of a CPU, an MPU, or any other processor. The PC controller 21 controls each of the sections of the PC 2 by causing the PC processor 210 to execute a program.

The PC storage 220 is a storage apparatus that stores data in a nonvolatile manner with the aid of a flash memory, a magnetic recording medium, or an optical recording medium. The PC storage 220 stores, for example, the program executed by the PC processor 210 and data processed by the PC processor 210. The PC storage 220 stores, for example, an operating system (OS) 221, an application program 222, and image data 223. The OS 221 is basic control software that controls the PC 2 and provides a platform on which the application program 222 is executed. The application program 222 is a program that provides the function of outputting a video to the projector 1. The image data 223 is image data that can be processed and transmitted by the PC 2 and is, for example, video data on a video content. The PC 2 causes the display 20 to display an image based on the image data 223 under the control of the PC controller 21.

The PC display section 24 drives the display 20 under the control of the PC controller 21 to cause the display 20 to display an image or a video. The PC display section 24 is, for example, a circuit that includes an integrated circuit that processes the image data and outputs an image signal to the display 20. The PC display section 24 may be connected to a display device external to the PC 2 and cause the display device to display an image.

The PC input section 25 includes an input device operated by a user of the PC 2, or connected to the input device. The input device is, for example, a switch panel including operation switches, a touch panel, a mouse, or a keyboard. The PC input section 25 detects the user's operation performed on the input device and outputs the result of the detection to the PC controller 21.

The PC communication section 26 is a communication apparatus connected to the communication network NW and includes a transmitter that transmits data and a receiver that receives data. The PC communication section 26 communicates with the projector 1 via the communication network NW under the control of the PC controller 21. The PC communication section 26 includes, for example, a connector to which an Ethernet cable is coupled, and a communication circuit that transmits and receives signals. The PC communication section 26 may be a wireless communication apparatus that performs wireless communication compliant, for example, with Wi-Fi. The PC communication section 26 is an example of a communication apparatus.

The PC processor 210 outputs an image to the projector 1 by executing the application program 222. In this case, the PC processor 210 carries out the process of reading the image data 223 from the PC storage 220 and reproducing the image data 223. In detail, the PC processor 210 causes the PC display section 24 to display an image based on the image data 223 on the display 20. The PC processor 210 outputs the image displayed on the display 20 to the projector 1 via the communication network NW. The PC processor 210 further displays an image and other pieces of information on the display 20 with the aid of a function of the OS 221. In this case, the PC processor 210 outputs the image displayed on the display 20 to the projector 1.

The terminal apparatus 3 includes a TE controller 31, a TE display section 34, a TE input section 35, and a TE communication section 36, which are interconnected to each other via a bus 37.

The TE controller 31 includes a TE processor 310 and a TE storage 320. The TE processor 310 is formed of a CPU, an MPU, or any other processor. The TE controller 31 controls each section of the terminal apparatus 3 by causing the TE processor 310 to execute a program.

The TE storage 320 is a storage apparatus that stores data in a nonvolatile manner with the aid of a flash memory, a magnetic recording medium, or an optical recording medium. The TE storage 320 stores, for example, the program executed by the TE processor 310 and data processed by the TE processor 310. The TE storage 320 stores, for example, an OS 321, an application program 322, and image data 323. The OS 321 is basic control software that controls the terminal apparatus 3 and provides a platform on which the application program 322 is executed. The application program 322 is a program that provides the function of outputting a video to the projector 1. The image data 323 is image data that can be processed and transmitted by the terminal apparatus 3 and is, for example, video data on a video content. The terminal apparatus 3 causes the touch panel 30 to display an image based on the image data 323 under the control of the TE controller 31.

The TE display section 34 drives the touch panel 30 under the control of the TE controller 31 to cause the touch panel 30 to display an image or a video. The TE display section 34 may be connected to a display device external to the terminal apparatus 3 and cause the display device to display an image.

The TE input section 35 accepts an input from a user of the terminal apparatus 3 by detecting touch operation performed on the touch panel 30 and outputs the content of the input to the TE controller 31. The TE input section 35 may be connected to an input device different from the touch panel 30.

The TE communication section 36 is a communication apparatus connected to the communication network NW and includes a transmitter that transmits data and a receiver that receives data. The TE communication section 36 communicates with the projector 1 via the communication network NW under the control of the TE controller 31. The TE communication section 36 includes, for example, a connector to which an Ethernet cable is coupled, and a communication circuit that transmits and receives signals. The TE communication section 36 may be a wireless communication apparatus that performs wireless communication compliant, for example, with Wi-Fi.

The TE processor 310 outputs an image to the projector 1 by executing the application program 322. In this case, the TE processor 310 carries out the process of reading the image data 223 from the PC storage 220 and reproducing the image data 223. In detail, the TE processor 310 causes the PC display section 24 to display an image based on the image data 223 on the touch panel 30. The TE processor 310 outputs the image displayed on the touch panel 30 to the projector 1 via the communication network NW. The TE processor 310 further displays an image and other pieces of information on the touch panel 30 with the aid of a function of the OS 321. In this case, the TE processor 310 outputs the image displayed on the touch panel 30 to the projector 1.

Figure 4:
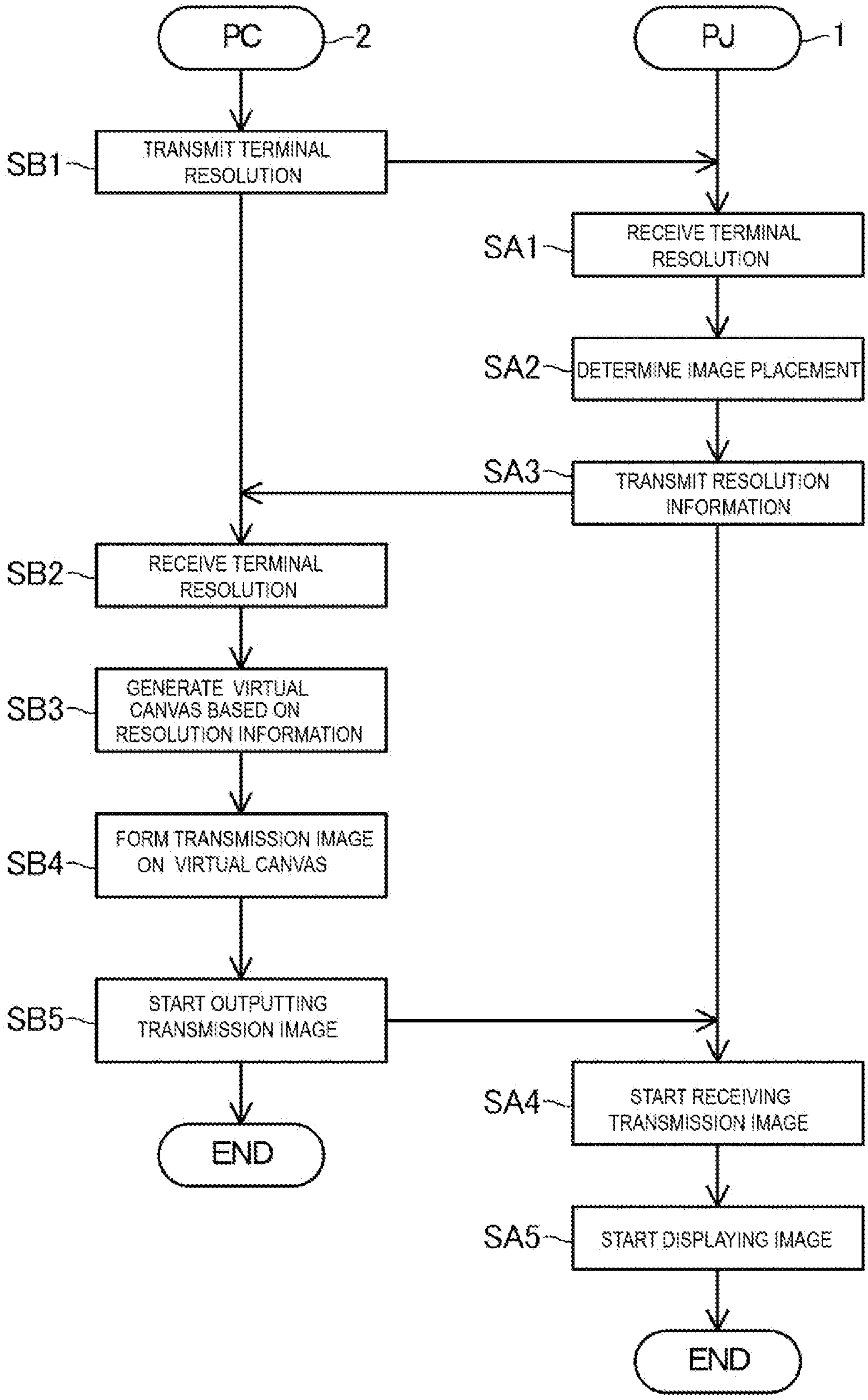
FIG. 4 is a sequence diagram showing an example of the actions of the display system.
Figure 5:
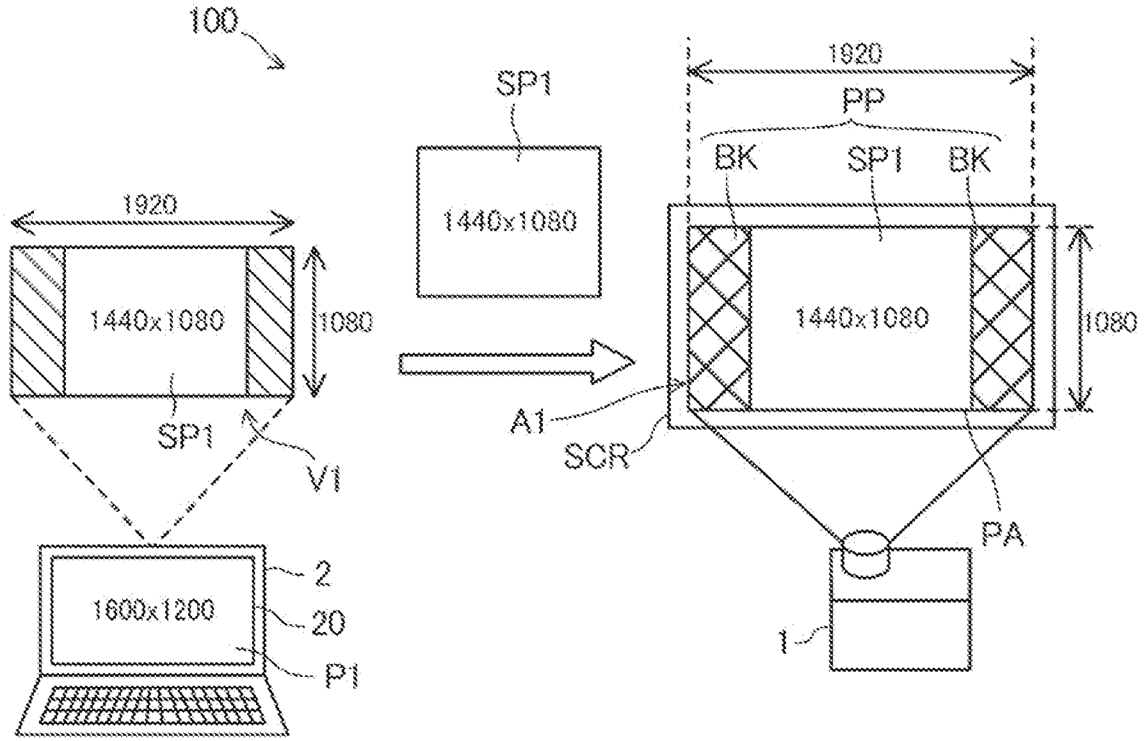
FIG. 5 describes the actions of the display system shown in FIG. 4.

4. Actions of Display System 4-1. Actions Performed when One Image Output Apparatus is Used FIG. 4 is a sequence diagram showing an example of the actions of the display system 100. Steps SA1 to SA5 in FIG. 4 are actions performed by the PJ controller 11 of the projector 1, and steps SB1 to SB5 are actions performed by the PC controller 21 of the PC 2. FIG. 5 describes the actions of the display system 100 shown in FIG. 4, and the specific numerical values of the resolution shown in FIG. 5 are for descriptive purposes only.

FIGS. 4 and 5 show the actions of the PC 2 outputting an image to the projector 1 as an example of the actions of the display system 100. In this case, the image output apparatus, including the terminal apparatus 3 but excluding the PC 2, does not output an image to the projector 1.

In this action example, the PC 2 generates a transmission image SP1 and outputs the transmission image SP1 to the projector 1, as shown in FIG. 5. The projector 1 displays the display image PP containing the transmission image SP1 transmitted by the PC 2 in the display region PA of the screen SCR.

The display region PA is the largest region where the projector 1 can display an image on the screen SCR. The display image PP is an image displayed by the projector 1 in the display region PA, and can also be called a projection image. The region where the transmission image SP1 is displayed in the display region PA is called a placement region A1. In the example shown in FIG. 5, the placement region A1 coincides with the display region PA.

In this action example, the PC 2 outputs an image that is the same as the PC image P1 displayed on the display 20 to the projector 1. It is assumed that the image that the PC 2 outputs to the projector 1 is the transmission image SP1. The transmission image SP1 is an image generated by the PC 2 by using image data that is the same as the image data 223 on the PC image P1.

In FIG. 4, the PC 2 transmits terminal resolution indicating the resolution of an image to be transmitted by the PC 2 to the projector 1 (step SB1). The terminal resolution is a resolution determined in accordance with the function of the PC 2 outputting an image. For example, the terminal resolution of the PC 2 is determined in accordance with the display resolution of the display 20. In this case, the terminal resolution transmitted by the PC 2 is the resolution of the PC image P1.

The PC 2 may be capable of outputting an image by using a plurality of different resolutions, and in this case, the PC 2 may transmit a plurality of terminal resolutions to the projector 1.

The projector 1 receives the terminal resolution from the PC 2 (step SA1). The projector 1 determines image placement based on the terminal resolution and the resolution of the display image PP, which can be displayed in the display region PA (step SA2). The image placement is the resolution and position of the transmission image when the transmission image transmitted by the PC 2 is used as the display image PP. In the action example shown in FIG. 4, the projector 1 displays only the image transmitted by the single PC 2. The image placement is therefore a placement in which the transmission image from the PC 2 is displayed at the center of the display image PP with the size of the transmission image maximized.

The projector 1 generates resolution information based on the image placement determined in step SA2, and transmits the generated resolution information to the PC 2 (step SA3). In the example shown in FIG. 5, the region where the transmission image from the PC 2 can be displayed is the entire display image PP. The resolution information in this case is horizontal 1920 dots and vertical 1080 dots, which is the resolution of the display image PP.

The PC 2 receives the resolution information transmitted by the projector 1 (step SB2) and generates a virtual canvas V1 based on the resolution information (step SB3). The virtual canvas V1 is a virtual display region where the PC 2 draws the transmission image SP1, and the resolution of the virtual canvas V1 is equal to the resolution information received from the projector 1. In the example shown in FIG. 5, the virtual canvas V1 having horizontal 1920 dots and vertical 1080 dots is generated.

The PC 2 forms the transmission image SP1 at the virtual canvas V1 (step SB4). In step SB4, the PC 2 maintains the aspect ratio of the PC image P1 and forms a largest possible transmission image SP1 formed on the virtual canvas. That is, the transmission image SP1 formed on the virtual canvas is an image so configured that either the horizontal or vertical resolution coincides with the resolution of the virtual canvas and the aspect ratio is equal to that of the PC image P1. In the example shown in FIG. 5, the transmission image SP1 having an aspect ratio of horizontal 1600 dots× vertical 1200 dots is formed on the virtual canvas V1 having horizontal 1920 dots and vertical 1080 dots. The resulting resolution of the transmission image SP1 is horizontal 1440 dots×vertical 1080 dots. The vertical resolution of the transmission image SP1 coincides with that of the virtual canvas V1, and the horizontal resolution of the transmission image SP1 is lower than that of the virtual canvas V1.

The PC 2 starts outputting the transmission image SP1 formed on the virtual canvas V1 (step SB5). The projector 1 starts receiving the transmission image SP1 output from the PC 2 (step SA4), and starts displaying the display image PP containing the received transmission image SP1 (step SA5).

In the display image PP, margin regions are created due to the difference between the resolution of the transmission image SP1 and the resolution of the display image PP in the horizontal direction, as shown in FIG. 5. Margin images BK are displayed in the margin regions. The transmission image SP1 output by the PC 2 is, however, an image formed in advance in accordance with the resolution of the display image PP, and therefore does not contain any margin regions.

The resolution of the transmission image SP1 is lower than or equal to the resolution of the display image PP. Specifically, when the aspect ratio of the virtual canvas V1 does not coincide with the aspect ratio of the PC image P1, the resolution of the transmission image SP1 coincides with the resolution of the display image PP in one of the horizontal and vertical directions, while the resolution of the transmission image SP1 is lower than the resolution of the display image PP in the other direction. When the aspect ratio of the virtual canvas V1 coincides with the aspect ratio of the PC image P1, the resolution of the transmission image SP1 coincides with the resolution of the display image PP in the horizontal and vertical directions. The transmission image SP1 thus does not contain the margin images BK and has a sufficient, necessary resolution, so that the transmission image SP1 does not contain unnecessary information. The amount of information sent from the PC 2 to the projector 1 can therefore be reduced, so that the efficiency of the transmission can be improved.

The transmission image SP1 corresponds to an example of a first image, and the display image PP corresponds to an example of a second image. The resolution information transmitted by the projector 1 includes a first resolution and a second resolution, and the terminal resolution of the PC 2 includes a third resolution and the second resolution. For example, in the example shown in FIGS. 4 and 5, the horizontal resolution of the display image PP is an example of the first resolution, and the vertical resolution of the display image PP and the vertical resolution of the terminal resolution are examples of the second resolution. The horizontal resolution of the transmission image SP1 is an example of the third resolution. In this example, the horizontal direction of the image is an example of a first direction, and the vertical direction of the image is an example of a second direction. The aspect ratio of the transmission image SP1 is an example of a first aspect ratio, and the aspect ratio of the display image PP is an example of a second aspect ratio. The horizontal resolution of the PC image P1 is an example of a fourth resolution, and the vertical resolution of the PC image P1 is an example of a fifth resolution.

4-2. Actions Performed when a Plurality of Image Output Apparatuses are Used

Figure 6:
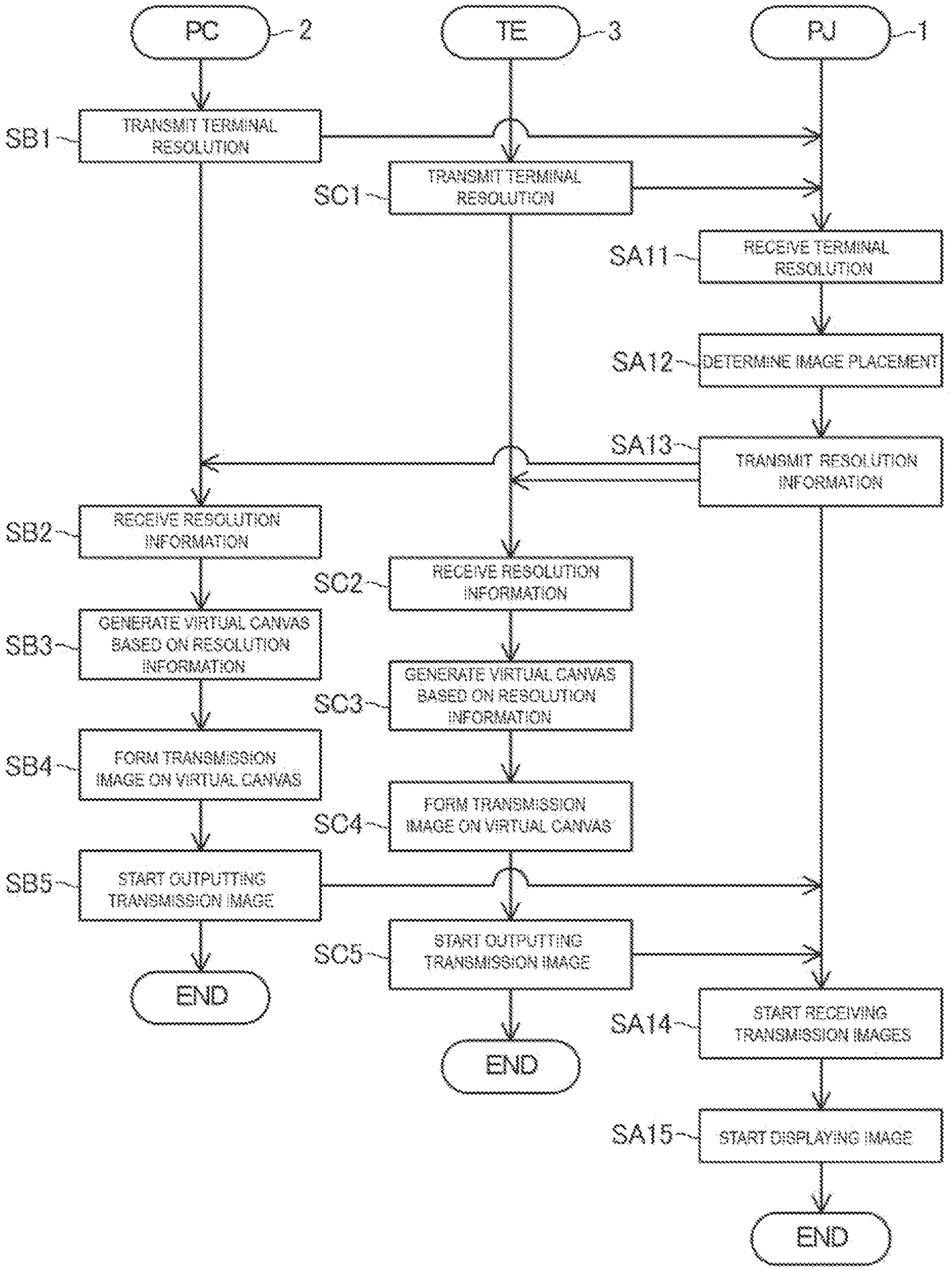
FIG. 6 is a sequence diagram showing another example of the actions of the display system.
Figure 7:
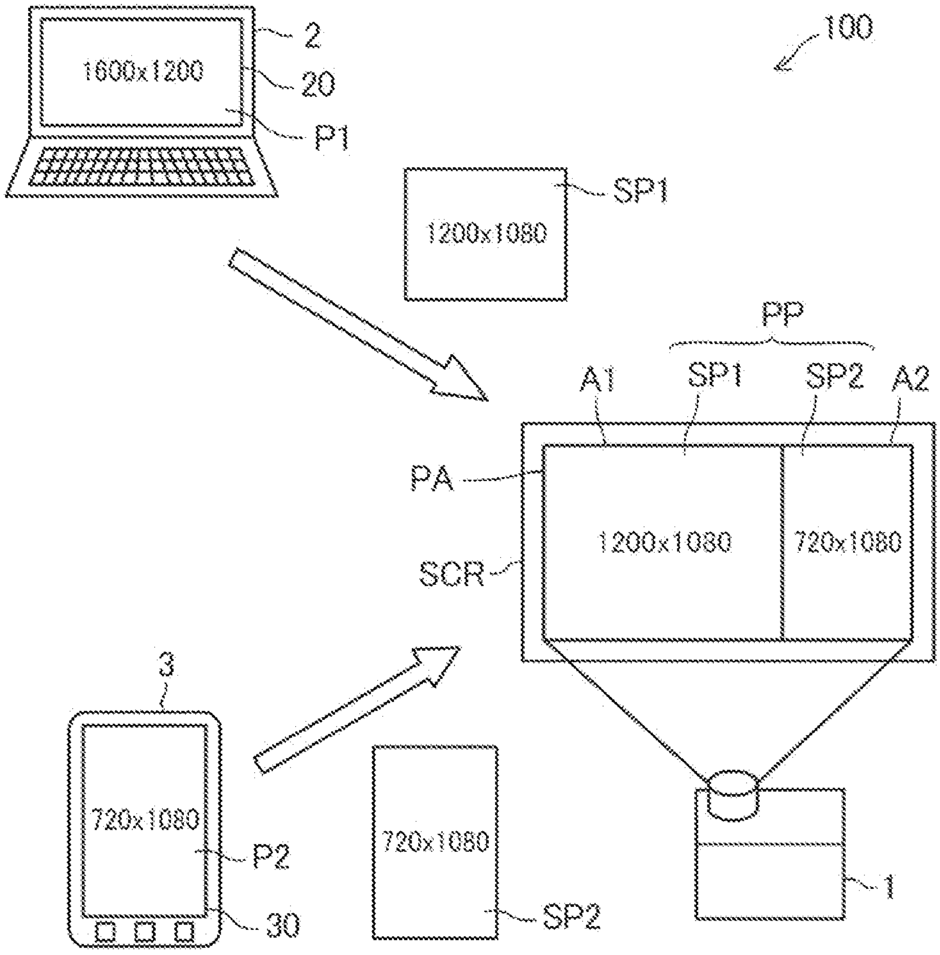
FIG. 7 describes the actions of the display system shown in FIG. 6.

FIG. 6 is a sequence diagram showing another example of the actions of the display system 100. Steps SA11 to SA15 in FIG. 6 are executed by the PJ controller 11. Steps SB1 to SB5 are actions that are the same as those in FIG. 4 and executed by the PC controller 21. Steps SC1 to SC5 are executed by the TE controller 31 of the terminal apparatus 3. FIG. 7 describes the actions of the display system 100 shown in FIG. 5, and the specific numerical values of the resolution shown in FIG. 7 are for descriptive purposes only.

FIGS. 6 and 7 show the actions of the PC 2 and the terminal apparatus 3 outputting images to the projector 1 as an example of the actions of the display system 100.

In this action example, the PC 2 generates the transmission image SP1 and outputs the transmission image SP1 to the projector 1, as described with reference to FIGS. 4 and 5. The transmission image SP1 is, for example, an image that is the same as the PC image P1, which the PC 2 displays on the display 20. The terminal apparatus 3 generates the transmission image SP2 and outputs the generated transmission image SP2 to the projector 1. The transmission image SP2 is, for example, an image that is the same as the TE image P2, which the terminal apparatus 3 displays on the touch panel 30. The projector 1 displays the display image PP containing the transmission image SP1 and the transmission image SP2 in the display region PA of the screen SCR.

The projector 1 provides the display region PA with the placement region A1, where the transmission image SP1 is displayed, and a placement region A2, where the transmission image SP2 is displayed. To effectively use the display region PA, it is preferable that the entire display region PA is divided into the placement regions A1 and A2. The projector 1 determines the position of the placement region A1 and the position of the placement region A2 in the display region PA in accordance with the setting information 122. The setting information 122 contains information for determining the position and resolution of the placement regions A1 and A2 based on the number of image output apparatuses connected to the projector 1, the type of the image output apparatuses, the resolution of output images from the image output apparatuses, and other factors.

In FIG. 6, the PC 2 transmits the terminal resolution indicating the resolution of an image to be transmitted by the PC 2 to the projector 1 (step SB1). The terminal apparatus 3 transmits the terminal resolution indicating the resolution of an image to be transmitted by the terminal apparatus 3 to the projector 1 (step SC1).

The projector 1 receives the terminal resolutions from the PC 2 and the terminal apparatus 3 (Step SA11). The projector 1 determines the image placement based on the terminal resolution of the PC 2, the terminal resolution of the terminal apparatus 3, and the resolution of the display image PP (step SA12). The image placement is the resolutions and positions of the transmission images that the PC 2 and the terminal apparatus 3 transmit and are used to form the display image PP. In the example shown in FIG. 7, the image placement including the resolution and position of the transmission image SP1 in the display region PA and the resolution and position of the transmission image SP2 in the display region PA is determined.

The projector 1 generates the resolution information on the resolution of the PC 2 and the resolution information on the resolution of the terminal apparatus 3 based on the image placement determined in step SA12, and transmits the generated resolution information to the PC 2 and the terminal apparatus 3 (step SA13). In the example shown in FIG. 7, the resolution information on the resolution of the PC 2 indicates horizontal 1200 dots×vertical 1080 dots, which is the resolution of the placement region A1. The resolution information on the resolution of the terminal apparatus 3 indicates horizontal 720 dots×vertical 1080 dots, which is the resolution of the placement region A2.

The PC 2 receives the resolution information transmitted by the projector 1 (step SB2), generates the virtual canvas V1 (step SB3), and forms the transmission image SP1 on the virtual canvas V1 (step SB4). The PC 2 starts outputting the transmission image SP1 formed on the virtual canvas V1 (step SB5).

The terminal apparatus 3 receives the resolution information transmitted by the projector 1 (step SC2) and generates the virtual canvas based on the received resolution information (step SC3). The virtual canvas generated in step SC3 is a virtual region having horizontal 720 dots×vertical 1080 dots indicated by the resolution information. The terminal apparatus 3 forms the transmission image SP2 on the virtual canvas (step SC4).

In step SC4, the terminal apparatus 3 maintains the aspect ratio of the TE image P2 and forms a largest possible transmission image SP2 formed on the virtual canvas. That is, the transmission image SP2 formed on the virtual canvas is an image so configured that either the horizontal or vertical resolution coincides with the resolution of the virtual canvas and the aspect ratio is equal to that of the TE image P2. In the example shown in FIG. 7, the transmission image SP2 having an aspect ratio of horizontal 720 dots× vertical 1080 dots is formed on the virtual canvas having horizontal 720 dots*vertical 1080 dots. The terminal apparatus 3 starts outputting the transmission image SP2 formed on the virtual canvas (step SC5).

The projector 1 starts receiving the transmission image SP1 output from the PC 2, further starts receiving the transmission image SP2 output from the terminal apparatus 3 (step SA14), and starts displaying the display image PP containing the received transmission image SP1 (step SA15).

As described above, in the display system 100, when a plurality of image output apparatuses transmit transmission images to the projector 1, the projector 1 arranges and displays the plurality of transmission images in the display region PA. In this action, the projector 1 transmits the resolution information to each of the image output apparatuses, and the image output apparatuses each output the transmission image based on the corresponding resolution information. The transmission images output by the image output apparatuses do not contain unnecessary information, so that the amount of information sent from the plurality of image output apparatuses to the projector 1 can be reduced, and the efficiency of the transmission can therefore be improved.

In the configuration in which the terminal apparatus 3 outputs the transmission image SP2 to the projector 1, the transmission image SP2 corresponds to an example of a third image. The terminal resolution of the terminal apparatus 3 includes the third resolution and the second resolution. For example, in the examples shown in FIGS. 6 and 7, the horizontal resolution of the transmission image SP2 is an example of the third resolution. The aspect ratio of the transmission image SP2 is an example of the first aspect ratio. The horizontal resolution of the TE image P2 is an example of the fourth resolution, and the vertical resolution of the TE image P2 is an example of the fifth resolution.

4-3. Actions Corresponding to Rotation of Terminal Apparatus

Figure 8:
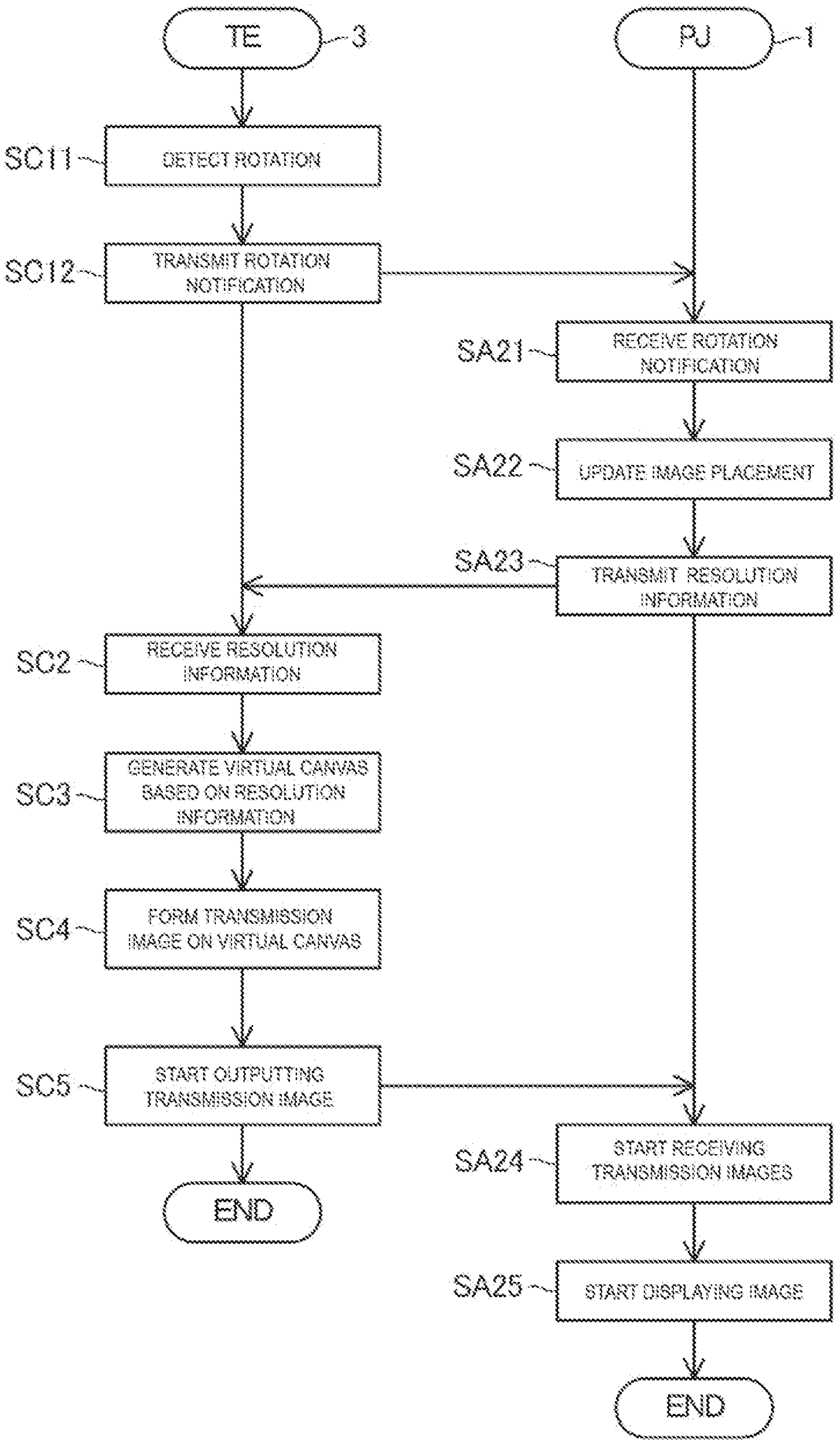
FIG. 8 is a sequence diagram showing another example of the actions of the display system.

FIG. 8 is a sequence diagram showing another example of the actions of the display system 100. FIG. 8 shows the actions performed when the terminal apparatus 3 rotates while outputting the transmission image SP2 to the projector 1.

The terminal apparatus 3 is a device that allows the touch panel 30 to be used in the portrait orientation, as shown in FIG. 1 and other figures. The user can also use the terminal apparatus 3 in such a way that the touch panel 30 is in the landscape orientation by rotating the terminal apparatus 3 by 90°. When the touch panel 30 is used in the portrait orientation, and the TE image P2 has the resolution of horizontal 720 dots×vertical 1080 dots, rotating the terminal apparatus 3 by 90° Causes the TE image P2 to have a resolution of horizontal 1080 dots×vertical 720 dots.

The actions in FIG. 8 are the actions performed when the terminal apparatus 3 is so rotated that the resolution of the touch panel 30 changes. Steps SA21 to SA25 are executed by the projector 1. Steps SC2 to SC5 and SC11 to SC12 are actions performed by the terminal apparatus 3, and the same step numbers are given to the actions common to those in FIG. 6.

When the terminal apparatus 3 detects that the terminal apparatus 3 has rotated while outputting the transmission image SP2 to the projector 1 (step SC11), the terminal apparatus 3 transmits rotation notification indicating the rotation to the projector 1 (step SC12). In step SC12, the terminal apparatus 3 may transmit the terminal resolution indicating the resolution of the rotated TE image P2 to the projector 1 in place of or in addition to the rotation notification. The terminal apparatus 3 may stop outputting the transmission image SP2 to the projector 1 in step SC12. The projector 1 receives the rotation notification from the terminal apparatus 3 (step SA21) and determines the image placement based on the terminal resolution of the rotated terminal apparatus 3 to update the image placement (step SA22). The projector 1 generates the resolution information of the terminal apparatus 3 in accordance with the updated image placement, and transmits the resolution information to the terminal apparatus 3 (step SA23).

The terminal apparatus 3 receives the resolution information from the projector 1 (step SC2). The action in step SC2 and the following steps are the same as the actions described with reference to FIG. 6.

When the terminal apparatus 3 starts outputting the transmission image SP2 (step SC5), the projector 1 starts receiving the transmission image SP2 (step SA24), and starts displaying the display image PP based on the received transmission image SP2 (step SA25).

As described above, when the terminal resolution of the image output apparatus changes while outputting an image to the projector 1, the projector 1 transmits the resolution information to the image output apparatus based on the changed terminal resolution. For example, the operation of rotating the terminal apparatus 3 corresponds to the operation of changing the resolution. The projector 1 therefore optimizes the placement of the transmitted image in the display image PP in correspondence with the change in the terminal resolution of the image output apparatus, and the image output apparatus transmits the image in accordance with the optimized placement. The display system 100 can therefore reduce the amount of information sent from the image output apparatus to the projector 1 in correspondence with the change in the terminal resolution to improve the efficiency of the transmission.

The actions shown in FIG. 8 can also be applied, for example, to a case where the display resolution of the display 20 changes while the PC 2 is outputting the transmission image SP1 to the projector 1.

4-4. Actions Relating to Change in Displayed Image

Figure 9:
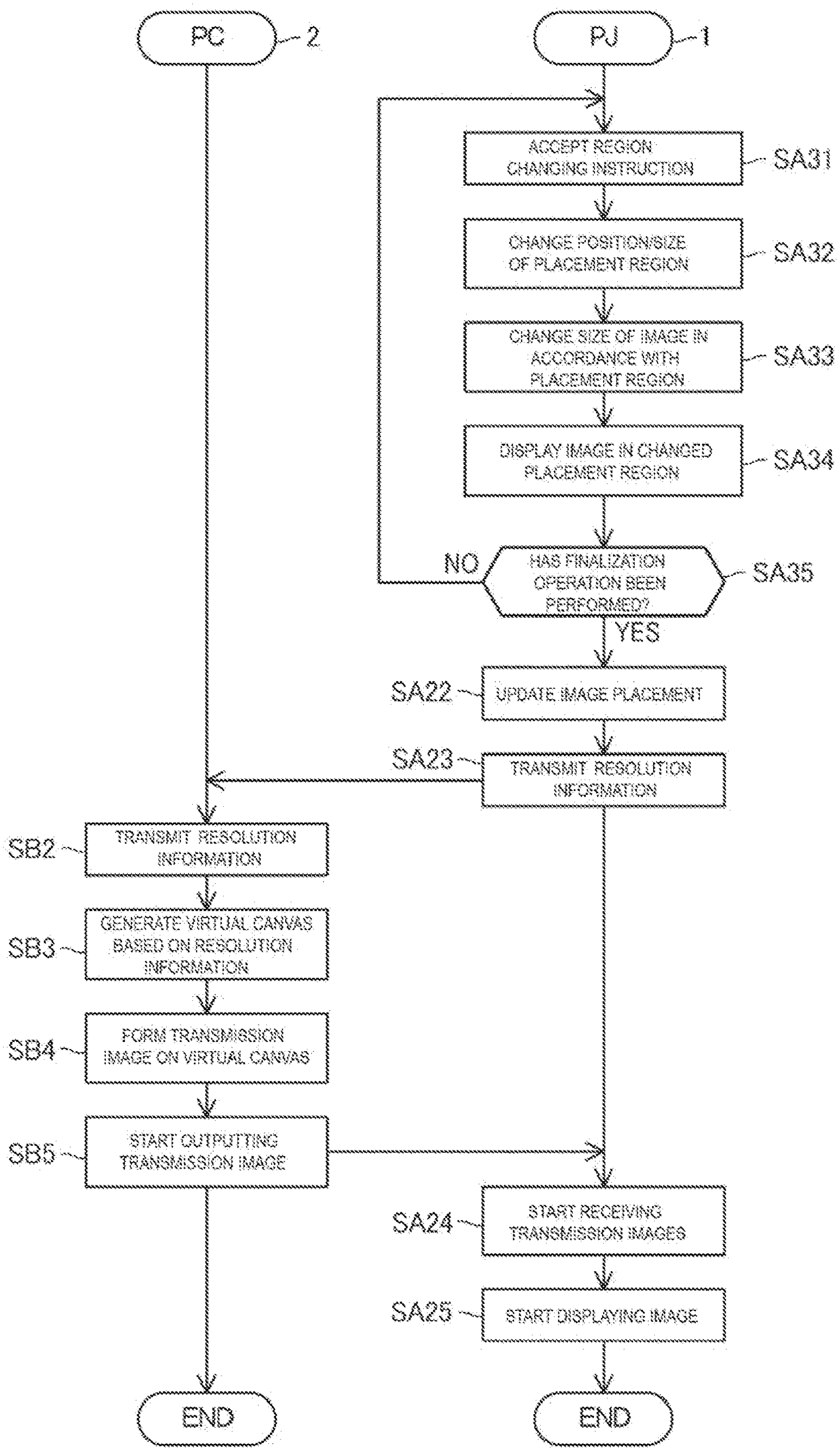
FIG. 9 is a sequence diagram showing another example of the actions of the display system.

FIG. 9 is a sequence diagram showing another example of the actions of the display system 100. Steps SA22 to SA25 and SA31 to SA35 in FIG. 9 are executed by the PJ controller 11. Out of the steps described above, steps SA22 to SA25 are actions that are the same as those in FIG. 8. Steps SB2 to SB5 are actions that are the same as those in FIG. 4 and executed by the PC controller 21.

Figure 10:
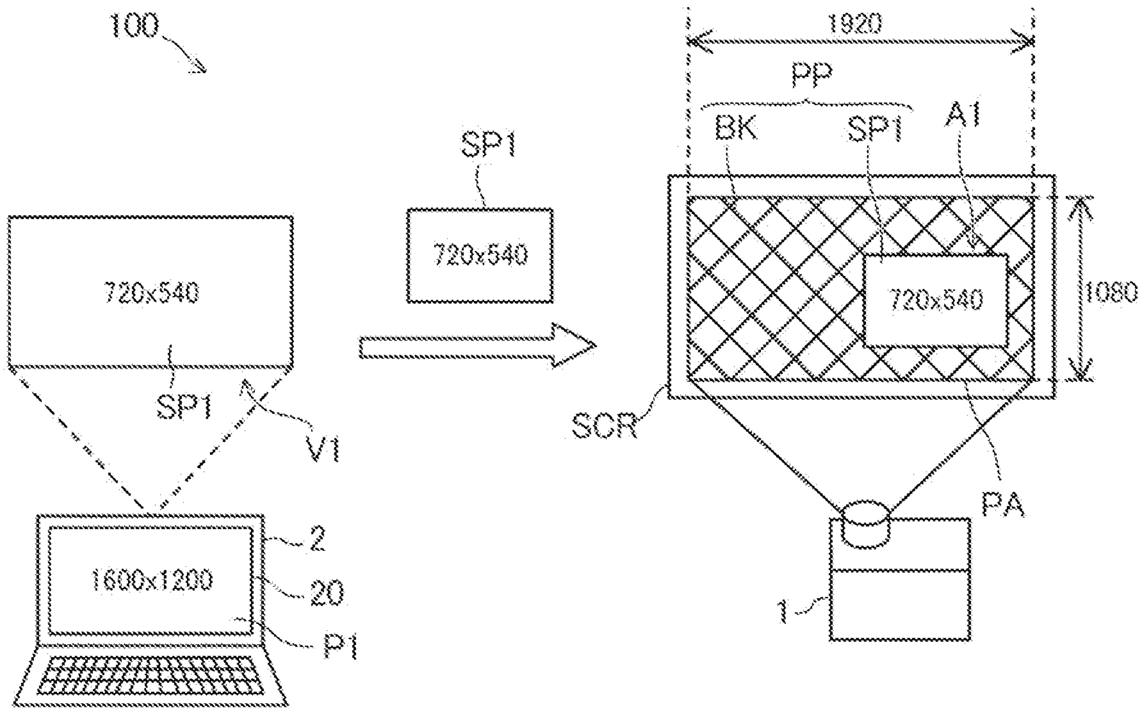
FIG. 10 describes the actions of the display system shown in FIG. 9.

FIG. 10 describes the actions of the display system 100 shown in FIG. 9, and the specific numerical values of the resolution shown in FIG. 10 are for descriptive purposes only.

The actions shown in FIG. 9 are performed in the state in which the PC 2 is outputting the transmission image SP1 to the projector 1. The projector 1 has the function that allows the size of the transmission image SP1 displayed in the display region PA to be changed in accordance with the user's region changing instruction. The region changing instruction includes at least one of an instruction to change the position of the placement region A1 in the display region PA and an instruction to change the size of the placement region A1. The region changing instruction is input to the projector 1, for example, by the user operating the remote control apparatus, which is not shown, or the operation panel 16. The size of a region or an image corresponds to the resolution. For example, the size of the placement region A1 is numerical values indicating the horizontal and vertical resolutions of the placement region A1. The region changing instruction corresponds to the operation of changing the resolutions of the placement regions A1 and A2. For example, when the projector 1 is displaying the transmission image SP1 having the largest size in the display region PA as shown in FIG. 5, and the user instructs the projector 1 to change the size of the displayed transmission image SP1, the projector 1 changes the size of the placement region A1 in the display region PA. In the example shown in FIG. 10, the size of the placement region A1 is changed to a size smaller than that of the display region PA, and the position of the placement region A1 is changed from the center of the display region PA to a position shifted rightward and downward. In this case, the resolution of the placement region A1 is lower than that of the display region PA in the horizontal and vertical directions. Specifically, the resolution of the display region PA is horizontal 1920 dots×vertical 1080 dots, whereas the changed resolution of the placement region A1 is horizontal 720 dots×vertical 540 dots. When the user instructs to change the size of the displayed transmission image SP1, the user may change the size of the displayed transmission image SP1 by specifying the resolution. In this case, the operation of specifying the resolution corresponds to the region changing instruction.

When the projector 1 accepts the region changing instruction issued by the user (step SA31), the projector 1 changes at least one of the position and size of the placement region A1 in accordance with the region changing instruction (step SA32), as shown in FIG. 9. The projector 1 performs image processing that changes the size of the display image PP in accordance with the changed placement region A1 (step SA33), and displays the display image PP having undergone the image processing in the changed placement region A1 (step SA34). In steps SA33 and SA34, the projector 1 performs image processing on the transmission image SP1 received from the PC 2 and adjusts the position where the received transmission image SP1 is displayed, but the resolution of the transmission image SP1 output by the PC 2 does not change.

The projector 1 evaluates whether the user has performed a finalization operation of finalizing the content of the region changing instruction (step SA35). When the finalization operation has not been performed (NO in step SA35), the projector 1 returns to step SA31. The user can thus issue the region changing instruction, and further issue the region changing instruction depending on the result of the changes in the size and position of the display image PP according to the region changing instruction. When the size and position of the transmission image SP1 on the screen SCR have been changed as desired, the user operates the remote control apparatus, which is not shown, or the operation panel 16 to perform the finalization operation.

When the result of the evaluation shows that the finalization operation has been performed (YES in step SA35), the projector 1 updates the image placement (step SA22). The projector 1 generates the resolution information of the PC 2 in accordance with the updated image placement, and transmits the resolution information to the PC 2 (step SA23).

The PC 2 receives the resolution information from the projector 1 (step SB2). The PC 2 generates the virtual canvas V1 in accordance with the received resolution information (step SB3), and forms the transmission image SP1 on the generated virtual canvas V1 (step SB4). The PC 2 starts outputting the transmission image SP1 formed on the virtual canvas V1 (step SB5). In step SB5, the PC 2 starts outputting the transmission image SP1 based on the new resolution information.

The projector 1 starts receiving the transmission image SP1 from the PC 2 (step SA24), and starts displaying the display image PP based on the received transmission image SP1 (step SA25).

As described above, while an image is output from the image output apparatus to the projector 1, the display size and display position of the transmission image output by the image output apparatus can be changed by the user's instruction. The user can repeatedly change the display size and display position of the transmission image until the display size and display position are finalized. Until the display size and display position of the transmission image are finalized, the resolution of the transmission image output by the image output apparatus is not changed, and the projector 1 changes the resolution of the transmission image and changes the display position thereof in accordance with a change in the placement region. After the display size and display position of the transmission image are finalized, the projector 1 transmits the new resolution information to the image output apparatus, so that the resolution of the transmission image output by the image output apparatus is changed. The user can thus change the display size and position of the transmission image in the display region PA in any manner. The projector 1 then changes the display operation performed until the display size and display position of the transmission image are finalized, so that the amount of information transmitted and received between the projector 1 and the image output apparatus is reduced. The amount of information sent from the image output apparatus to the projector 1 can thus be reduced to improve the efficiency of the transmission.

5. Other Embodiments

The embodiment described above is a preferable embodiment of the present disclosure. The present disclosure is, however, not limited to the embodiment described above, and a variety of variations are conceivable to the extent that the variations do not depart from the substance of the present disclosure.

For example, in the embodiment described above, the PC 2 and the terminal apparatus 3 have been presented as the image output apparatus, but there are no restrictions on the specific aspect of the image output apparatus. For example, the image output apparatus may be a computer such as a desktop PC or an apparatus other than a computer. Specifically, a digital versatile disc (DVD) player, a network player, or any other similar apparatus may be used as the image output apparatus.

The display apparatus is not limited to the projector 1, and may, for example, be a liquid crystal display apparatus that displays an image at a liquid crystal display panel, a display apparatus that displays an image at an organic EL panel, or a self-luminous display apparatus, such as a monitor or a liquid crystal television. Any of a variety of other display apparatuses may instead be used.

The PJ processor 110, the PC processor 210, and the TE processor 310 may each be a single processor or may be formed of a plurality of processors.

The functional portions of the projector 1, the PC 2, and the terminal apparatus 3 shown in FIGS. 2 and 3 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, in the embodiment and variations described above, part of the functions achieved by software may be achieved by hardware, or part of the functions achieved by hardware may be achieved by software.

The process units shown in FIGS. 4, 6, 8, and 9 are process units divided in accordance with the contents of the primary processes for easy understanding of the actions of the portions described above. How to produce the divided process units or the names of the process units do not limit the present disclosure. For example, each of the processes in the figures described above can be further divided into a larger number of process units, or can be so divided that the process units each include a larger number of processes in accordance with the content of the process.

The control program 121 can instead be recorded, for example, in a non-temporary manner on a recording medium readable by the projector 1. The recording medium can be a magnetic or optical recording medium or a semiconductor memory device. The same holds true for the application programs 222 and 322. Examples of the recording medium may include a flexible disk, a CD-ROM (compact disk read only memory), a DVD (digital versatile disc), a magneto-optical disk, a flash memory, and a portable or immobile recording medium such as a card-shaped recording medium. The programs can be stored, for example, in a server apparatus, and any of the projector 1, the PC 2, and the terminal apparatus 3 can download the programs from the server apparatus to achieve the actions described above.

6. Summary of Present Disclosure

The present disclosure will be summarized below as additional remarks.

Additional Remark 1

A display system including an image output apparatus that outputs an image having a first aspect ratio, and a display apparatus that displays the image output by the image output apparatus, the display apparatus transmitting resolution information to the image output apparatus, the resolution information containing information indicating a first resolution that is the resolution in a first direction and a second resolution that is the resolution in a second direction perpendicular to the first direction, the image output apparatus performing receiving the resolution information from the display apparatus, and outputting a first image to the display apparatus based on the resolution information, the first image having a third resolution lower than the first resolution, and the second resolution and having an aspect ratio equal to the first aspect ratio, and the display apparatus displaying a second image containing the first image and having the first and second resolutions.

The image output apparatus thus adjusts the resolution of the first image to be output by the image output apparatus to the display apparatus to the resolution of the second image to be displayed by the display apparatus. An image output from the image output apparatus to the display apparatus is therefore sent with the output image optimized in accordance with the resolution of the image displayed by the display apparatus. The amount of information sent from the image output apparatus to the display apparatus can thus be reduced to improve the efficiency of the image sending operation. Furthermore, the display apparatus can omit the process of optimizing the resolution, so that the efficiency of the processes carried out by the display apparatus can be improved.

Additional Remark 2

The display system described in the additional remark 1, in which the image output apparatus includes a display, the image output apparatus displays a third image on the display, the third image having a fourth resolution as the resolution in the first direction and a fifth resolution as the resolution in the second direction, and having the first aspect ratio, and the image output apparatus outputs the first image to the display apparatus when the first aspect ratio differs from a second aspect ratio corresponding to the first and second resolutions.

Therefore, when the aspect ratio corresponding to the resolution specified by the display apparatus differs from the aspect ratio of the image output by the image output apparatus, and, for example, when the display apparatus performs display in a letterbox or a pillar box format, any margin can be omitted from the image output by the image output apparatus. The amount of information sent from the image output apparatus to the display apparatus can thus be effectively reduced.

Additional Remark 3

The display system described in the additional remark 2, in which the image output apparatus outputs the third image to the display apparatus when the first aspect ratio is equal to the second aspect ratio.

Therefore, when the display apparatus does not need to perform display operation, for example, in a letterbox or pillar box format, an appropriate image can be output from the image output apparatus to the display apparatus.

Additional Remark 4

The display system described in the additional remark 2 or 3, in which the first image output by the image output apparatus is an image generated by enlarging or reducing the third image in accordance with the second resolution in such a way that the second aspect ratio is maintained.

Therefore, the amount of information sent from the image output apparatus to the display apparatus can thus be reduced, and the display apparatus can display the image output by the image output apparatus with the aspect ratio of the image maintained.

Additional Remark 5

The display system described in any of the additional remarks 1 to 4, in which the display apparatus includes an optical apparatus that displays an image in a display region, a placement region where the second image is placed is set in the display region, and the first and second resolutions are the resolution of the placement region or a resolution corresponding to the aspect ratio of the placement region.

Therefore, the image output apparatus can output an image appropriate for the display region of the display apparatus to the display apparatus, and the amount of information sent from the image output apparatus to the display apparatus can be reduced.

Additional Remark 6

The display system described in the additional remark 5, in which the display apparatus performs accepting the operation of changing the resolution of the placement region, changing the resolution of the second image to the changed resolution of the placement region in accordance with the operation, displaying the second image the resolution of which is the changed resolution of the placement region, and transmitting the resolution information containing the first and second resolutions corresponding to the changed resolution of the placement region to the image output apparatus when accepting the operation of finalizing the resolution of the placement region.

Therefore, the display apparatus can change the placement and other factors of the image output by the image output apparatus, and the amount of information sent from the display apparatus to the image output apparatus and vice versa can be reduced during the changing operation.

Additional Remark 7

The display system described in the additional remark 5 or 6, in which the second image contains the first image and a margin image corresponding to the difference between the first resolution and the third resolution.

Therefore, when the display apparatus displays the margin image and the second image in the placement region, the image output apparatus outputs the second image that does not contain the margin image to the display apparatus. The amount of information sent from the image output apparatus to the display apparatus can thus be effectively reduced.

Additional Remark 8

An image output apparatus including a communication apparatus that transmits an image to a display apparatus, and at least one processor, the processor performing transmitting an image having a first aspect ratio via the communication apparatus, receiving resolution information from the display apparatus via the communication apparatus, the resolution information containing information indicating a first resolution that is the resolution in a first direction and a second resolution that is the resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio.

The image output apparatus thus adjusts the resolution of the first image to be output by the image output apparatus to the display apparatus to the resolution of the second image to be displayed by the display apparatus. An image output from the image output apparatus to the display apparatus is therefore sent with the output image optimized in accordance with the resolution of the image displayed by the display apparatus. The amount of information sent from the image output apparatus to the display apparatus can thus be reduced to improve the efficiency of the image sending operation. Furthermore, the display apparatus can omit the process of optimizing the resolution, so that the efficiency of the processes carried out by the display apparatus can be improved.

Additional Remark 9

A program executed by a computer including a display apparatus and a communication apparatus that transmits an image, the program causing the computer to perform transmitting an image having a first aspect ratio via the communication apparatus, receiving resolution information from the display apparatus via the communication apparatus, the resolution information containing information indicating a first resolution that is the resolution in a first direction and a second resolution that is the resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio.

The computer executes the program to adjust the resolution of the first image that the computer outputs to the display apparatus to the resolution of the second image that the display apparatus displays. An image output from the computer to the display apparatus is therefore sent with the output image optimized in accordance with the resolution of the image displayed by the display apparatus. The amount of information sent from the computer to the display apparatus and vice versa can thus be reduced to improve the efficiency of the image sending operation. Furthermore, the display apparatus can omit the process of optimizing the resolution, so that the efficiency of the processes carried out by the display apparatus can be improved.

What is claimed is:

1. A display system comprising:

an image output apparatus that outputs an image having a first aspect ratio; and a display apparatus that displays the image output by the image output apparatus, wherein the display apparatus transmits resolution information to the image output apparatus, the resolution information containing information indicating a first resolution that is a resolution in a first direction and a second resolution that is a resolution in a second direction perpendicular to the first direction, the image output apparatus performs:

receiving the resolution information from the display apparatus, and outputting a first image to the display apparatus based on the resolution information, the first image having a third resolution lower than the first resolution, and the second resolution and having an aspect ratio equal to the first aspect ratio, the display apparatus displays a second image containing the first image and having the first and second resolutions, the display apparatus includes an optical apparatus that displays an image in a display region, a placement region where the second image is placed is set in the display region, the first and second resolutions are a resolution of the placement region or a resolution corresponding to an aspect ratio of the placement region, and the display apparatus performs:

accepting the operation of changing the resolution of the placement region, changing the resolution of the second image to the changed resolution of the placement region in accordance with the operation, displaying the second image the resolution of which is the changed resolution of the placement region, and transmitting the resolution information containing the first and second resolutions corresponding to the changed resolution of the placement region to the image output apparatus when accepting the operation of finalizing the resolution of the placement region.

2. The display system according to claim 1, wherein the image output apparatus includes a display, displays a third image on the display, the third image having a fourth resolution as the resolution in the first direction and a fifth resolution as the resolution in the second direction, and having the first aspect ratio, and outputs the first image to the display apparatus when the first aspect ratio differs from a second aspect ratio corresponding to the first and second resolutions.

3. The display system according to claim 2, wherein the image output apparatus outputs the third image to the display apparatus when the first aspect ratio is equal to the second aspect ratio.

4. The display system according to claim 2, wherein the first image output by the image output apparatus is an image generated by enlarging or reducing the third image in accordance with the second resolution in such a way that the second aspect ratio is maintained.

5. The display system according to claim 1, wherein the second image contains the first image and a margin image corresponding to a difference between the first resolution and the third resolution.

6. An image output apparatus comprising:

a display apparatus, a communication apparatus that transmits an image to the display apparatus; and at least one processor, wherein the processor performs:

transmitting an image having a first aspect ratio via the communication apparatus, receiving resolution information from the display apparatus via the communication apparatus, the resolution information containing information indicating a first resolution that is a resolution in a first direction and a second resolution that is a resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio, the display apparatus includes an optical apparatus that displays an image in a display region, a placement region where the second image is placed is set in the display region, the first and second resolutions are a resolution of the placement region or a resolution corresponding to an aspect ratio of the placement region, and the display apparatus performs:

accepting the operation of changing the resolution of the placement region, changing the resolution of the second image to the changed resolution of the placement region in accordance with the operation, displaying the second image the resolution of which is the changed resolution of the placement region, and transmitting the resolution information containing the first and second resolutions corresponding to the changed resolution of the placement region to the processor when accepting the operation of finalizing the resolution of the placement region.

7. A non-transitory computer-readable storage medium storing a program executed by a computer including a display apparatus and a communication apparatus that transmits an image, the program causing the computer to perform transmitting an image having a first aspect ratio via the communication apparatus, receiving resolution information from the display apparatus via the communication apparatus, the resolution information containing information indicating a first resolution that is a resolution in a first direction and a second resolution that is a resolution in a second direction perpendicular to the first direction, and outputting a first image to the display apparatus based on the resolution information when receiving the resolution information, the first image having a third resolution lower than the first resolution, and the second resolution and having an aspect ratio equal to the first aspect ratio, wherein the display apparatus includes an optical apparatus that displays an image in a display region, a placement region where the second image is placed is set in the display region, and the first and second resolutions are a resolution of the placement region or a resolution corresponding to an aspect ratio of the placement region, the program causing the display apparatus to perform:

accepting the operation of changing the resolution of the placement region, changing the resolution of the second image to the changed resolution of the placement region in accordance with the operation, displaying the second image the resolution of which is the changed resolution of the placement region, and transmitting the resolution information containing the first and second resolutions corresponding to the changed resolution of the placement region to the computer when accepting the operation of finalizing the resolution of the placement region.

* * * * *